US008832806B2

(12) United States Patent
Ozzie et al.

(10) Patent No.: US 8,832,806 B2
(45) Date of Patent: Sep. 9, 2014

(54) USER AUTHENTICATION MANAGEMENT

(71) Applicant: Microsoft Corporation, Redmond, WA (US)

(72) Inventors: Raymond E. Ozzie, Seattle, WA (US); Jack E. Ozzie, North Bend, WA (US); Thomas A. Galvin, Amherst, NH (US); Eric M. Patey, Rockport, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/652,025

(22) Filed: Oct. 15, 2012

(65) Prior Publication Data

US 2013/0042309 A1 Feb. 14, 2013

Related U.S. Application Data

(63) Continuation of application No. 12/254,119, filed on Oct. 20, 2008, now Pat. No. 8,307,412.

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC ............. 726/5; 726/4; 726/6; 726/8; 713/155

(58) Field of Classification Search
None
See application file for complete search history.

(56) References Cited

U.S. PATENT DOCUMENTS

| 6,934,858 | B2 | 8/2005 | Woodhill |
| 6,993,658 | B1 | 1/2006 | Engberg et al. |
| 8,151,328 | B1 * | 4/2012 | Lundy et al. ................. 726/5 |

(Continued)

FOREIGN PATENT DOCUMENTS

| CN | 1578939 | A | 2/2005 |
| CN | 1838141 | A | 9/2006 |
| CN | 101034988 | A | 9/2007 |
| WO | 2008053279 | A1 | 5/2008 |

OTHER PUBLICATIONS

EP Search Report cited in EP Application No. 09822510.5 Dated: Apr. 12, 2012 pp. 1-9.

(Continued)

*Primary Examiner* — Shin-Hon Chen
(74) *Attorney, Agent, or Firm* — Ben Tabor; Kate Drakos; Micky Minhas

(57) ABSTRACT

End users of a multi-factor authentication service can utilize an account management service, and third-party website can register to utilize the multi-factor authentication service. Registering a third-party website can comprise the multi-factor authentication service receiving a valid digital identity certificate for the third-party website, and receiving an agreement to terms of use of the multi-factor authentication service for the third-party website. Once received, the multi-factor authentication service can enable the third-party website to utilize the service (e.g., switch the service on, or send an authorization key to the third-party website). Further, registering a user to the multi-factor authentication service can comprise determining availability of service, and providing a location-specific access code. Additionally, registering the user can comprise registering the user's mobile device, for example, to provide multi-factor authentication. Also, an Internet-based user account management user interface can be provided that allows a user to view transactions on their account, and an ability to shut off a designated mobile device's ability to authenticate.

20 Claims, 8 Drawing Sheets

(56) References Cited

U.S. PATENT DOCUMENTS

| | | | |
|---|---|---|---|
| 2003/0154406 | A1 | 8/2003 | Honorvar et al. |
| 2005/0097320 | A1 | 5/2005 | Golan et al. |
| 2005/0239447 | A1* | 10/2005 | Holzman et al. ............ 455/414.3 |
| 2006/0204051 | A1 | 9/2006 | Holland, IV |
| 2006/0206709 | A1 | 9/2006 | Labrou et al. |
| 2006/0259438 | A1 | 11/2006 | Randle et al. |
| 2007/0011099 | A1 | 1/2007 | Sheehan et al. |
| 2007/0016941 | A1 | 1/2007 | Gonzalez et al. |
| 2007/0022196 | A1 | 1/2007 | Agrawal |
| 2007/0022301 | A1 | 1/2007 | Nicholson et al. |
| 2007/0107050 | A1 | 5/2007 | Selvarajan |
| 2007/0125840 | A1 | 6/2007 | Law et al. |
| 2007/0136573 | A1 | 6/2007 | Steinberg |
| 2007/0174630 | A1 | 7/2007 | Shannon et al. |
| 2007/0175978 | A1 | 8/2007 | Stambaugh et al. |
| 2007/0198435 | A1 | 8/2007 | Siegal et al. |
| 2007/0203836 | A1* | 8/2007 | Dodin ............................ 705/44 |
| 2007/0203850 | A1 | 8/2007 | Singh et al. |
| 2008/0005228 | A1 | 1/2008 | Subbian et al. |
| 2008/0250477 | A1 | 10/2008 | Samuelsson et al. |
| 2009/0047928 | A1 | 2/2009 | Utsch et al. |
| 2009/0235346 | A1 | 9/2009 | Steinberg |
| 2010/0100725 | A1 | 4/2010 | Ozzie |
| 2010/0100945 | A1 | 4/2010 | Ozzie |
| 2010/0146259 | A1 | 6/2010 | Tatham |
| 2010/0274859 | A1* | 10/2010 | Bucuk ........................... 709/206 |

OTHER PUBLICATIONS

International Preliminary Report on Patentability cited in PCT Application No. PCT/US2009/06119 Dated: Apr. 26, 2011.

"Mobile Key" Retrieved at: http://www.visualtron.com/products_mobilekey.htm Retrieved Date: Sep. 12, 2008 pp. 1-3.

"Phone-Based Two-Factor Authentication Now Available for OpenID" Retrieved at: http://www.reuters.com/article/pressRelease/idUS151722+12-May-2008+BW20080512 Retrieved Date: May 12, 2008 pp. 1-3.

"Xecure Message Service" Retrieved at: http://www.mynetsec.com/book/export/html/200 Retrieved Date: Sep. 18, 2008 pp. 1-15.

"PortWise", Retrieved at: http://www.portwise.com Retrieved Date: Sep. 25, 2008 p. 1.

"Entrust", Retrieved at: http://www.entrust.com/strong-authentication/user-authentication/methods.htm Retrieved Date: Sep. 25, 2008 pp. 1-4.

"UbisecQ: An Innovative Security Solution Provider in Asia", Retrieved at: http://www.free-press-release.com/new/200411/1100882632.html Date: Nov. 19, 2004 pp. 1-3.

Hoffmann, Gerhard., "Remote Access Solution with Mobile Phone / SMS-based Authentication?" Retrieved at: http://www.secure-gear.com/comp.security.misc/1/remote-access-solution-with-mobile-phone-SMS-based-authent-article4980-htm Date: Dec. 19, 2008 pp. 1-4.

"Phone Based 2-Factor Authentication-What is MobileKey?" Retrieved at: http://www.visualtron.com/products_mobilekey.htm Date: Sep. 25, 2008 pp. 1-3.

"Authentify—Out of Band Multifactor Authentication" Retrieved at: http://www.authentify.com Date: Sep. 25, 2008 p. 1.

Non Final Office Action cited in related U.S. Appl. No. 12/254,115 Dated: Mar. 18, 2011 pp. 1-20.

Amendment cited in related U.S. Appl. No. 12/254,115 Dated: Jun. 20, 2011 pp. 1-14.

Final Office Action cited in related U.S. Appl. No. 12/254,115 Dated: Sep. 14, 2011 pp. 1-11.

Amendment cited in related U.S. Appl. No. 12/254,115 Dated: Nov. 15, 2011 pp. 1-18.

Final Office Action cited in related U.S. Appl. No. 12/254,115 Dated: Apr. 24, 2012 pp. 1-19.

Non Final Office Action cited in related U.S. Appl. No. 12/254,115 Dated: Nov. 25, 2011 pp. 1-11.

Amendment cited in related U.S. Appl. No. 12/254,115 Dated: Feb. 27, 2011 pp. 1-12.

Non Final Office Action cited in related U.S. Appl. No. 12/254,115 Dated: Sep. 7, 2012 pp. 1-14.

Amendment cited in related U.S. Appl. No. 12/254,115 Dated: Jul. 24, 2012 pp. 1-16.

Amendment after Notice of Allowance cited in related U.S. Appl. No. 12/254,119 Dated: Oct. 7, 2012 pp. 1-2.

Amendment cited in related U.S. Appl. No. 12/254,119 Dated: Oct. 1, 2012 pp. 1-13.

Notice of Allowance cited in related U.S. Appl. No. 12/254,119 Dated: Jun. 29, 2012 pp. 1-13.

Amendment cited in related U.S. Appl. No. 12/254,119 Dated: Jun. 19, 2012 pp. 1-15.

Notice of Allowance cited in related U.S. Appl. No. 12/254,119 Dated: Mar. 19, 2012 pp. 1-12.

Notice of Allowance cited in related U.S. Appl. No. 12/254,119 Dated: Nov. 28, 2011 pp. 1-16.

Amendment cited in related U.S. Appl. No. 12/254,119 Dated: Aug. 18, 2011 pp. 1-19.

Non Final Office Action cited in related U.S. Appl. No. 12/254,119 Dated: Apr. 19, 2011 pp. 1-21.

Reply Non-Final Office Action cited in U.S. Appl. No. 12/254,115 dated Dec. 7, 2012, 12 pgs.

Notice of Allowance cited in U.S. Appl. No. 12/254,115 dated Jan. 3, 2013, 7 pgs.

Notice of Allowance cited in U.S. Appl. No. 12/254,115 dated Apr. 24, 2013, 10 pgs.

Int. Search Report cited in PCT Application No. PCT/US2009/061199 dated May 17, 2010, 11 pgs.

EP Communication cited in EP Application No. 09822510.5 dated May 2, 2012, 1 pg.

Reply EP Communication cited in EP Application No. 09822510.5 dated Nov. 8, 2012, 29 pgs.

First Chinese Office Action cited in Chinese Application No. 200980142417.9 dated Jul. 4, 2013, 10 pgs.

* cited by examiner

USER AUTHENTICATION MANAGEMENT

RELATED APPLICATION

This application is a continuation of U.S. patent application Ser. No. 12/254,119, filed on Oct. 20, 2008, entitled "USER AUTHENTICATION MANAGEMENT," at least some of at least one of which may be incorporated herein.

BACKGROUND

In a computing environment, websites often utilize user authentication for security purposes, for example, to access server or website content or to perform online transactions. User authentication typically requires that a user register their identification information with the website, often supplying a unique user name and an associated security code, for example, an alpha-numeric password. User authentication that utilizes a user name and associated password is typically referred to as single-factor authentication. Occasionally, websites may request that a user provide more than one form of authentication (e.g., a security key), which is often referred to as multi-factor authentication (e.g., two-factor authentication). Further, websites can utilize authentication codes in order to determine whether the user is a human or an Internet-bot (e.g., a computer used to spam a website). User authentication can also comprise "out-of-band" authentication whereby an authentication can take place outside of a previously established communication system (e.g., downloading an electronic key stored on a flash drive after entering a username and password on a webpage).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Often, when a user of a website wishes to access certain information or perform certain transactions on the website they are asked to enter a user name and password into a user interface (UI). Using a password associated with a particular username can provide for authentication of the user, for example, because the password is typically known only to the user who is registered with the website (e.g., a shared secret). However, security for remote access to websites can be compromised if passwords are used by those other than the registered user (e.g., by identity thieves). Multi-factor authentication can be used to add one or more layers of security to user authentication, for example, when a user performs an online purchase.

Current multi-factor authentication techniques include utilizing telephones or mobile devices as a second authentication factor. As an example, when a website user attempts to purchase an item online, the host website can send a short message service (SMS) message (e.g. a text message) to the user's mobile device (e.g., mobile phone). In this example, after receiving the SMS message, the user can reply with an authentication key provided by the website. In this way, for example, an identity thief would need the user's username, password, and designated mobile device in order to complete the authentication.

Previous and current solutions include a system that automatically calls a user designated telephone upon receiving an authentication request from a server system (Authentify, http://www.authentify.com). However, only those third-party sites that have a previous business arrangement and a specific license with the authentication service may utilize this type of multi-factor authentication for their users. Further, the current systems do not provide broad-based auto-provisioning of a third-party site, for example, typically requiring a lot of human interaction between a website developer/owner that wishes to utilize an authentication service and the service entity. Additionally, some current systems require that the website host and provide the multi-factor authentication request.

Previous and current solutions do not typically allow end user (e.g., users going through a multi-factor authentication process) management of the authentication process and related account information. For example, in current systems, an end user may not be able to readily access information concerning transactions that have occurred using their authentication information. Further, end users do not typically have a ready ability to manage when and how a multi-factor authentication can be used, or to shut down the service to their designated mobile device, for example.

Techniques and systems are provided herein for providing registration and account management of a multi-factor authentication service to Internet users and third-party websites. In one embodiment, registering a third-party website can comprise receiving a valid digital identity certificate (e.g., an SSL certificate) that covers the third-party website wishing to use the multi-factor authentication service. Further, in order to register the third-party website, the authentication service can receive an agreement to terms of use of the multi-factor authentication service for the third-party website. Once these items are received, in this embodiment, the multi-factor authentication service can enable the third-party website to utilize the service (e.g., switch the service on, or send an authorization key to the third-party website).

In this embodiment, registering a user with the multi-factor authentication service can comprise letting the user know, via a notice of availability of service, whether the service is available based on the user's locality, and providing a country-specific short code. Further, registering the user can comprise registering the user's mobile device (e.g., a mobile phone number) with the service, for example, in order to provide multi-factor authentication. Additionally, an Internet-based user account management user interface (UI) can be provided that allows a user to view transactions on their account, and an ability to shut off a designated mobile device's ability to authenticate (e.g., if the phone is lost).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
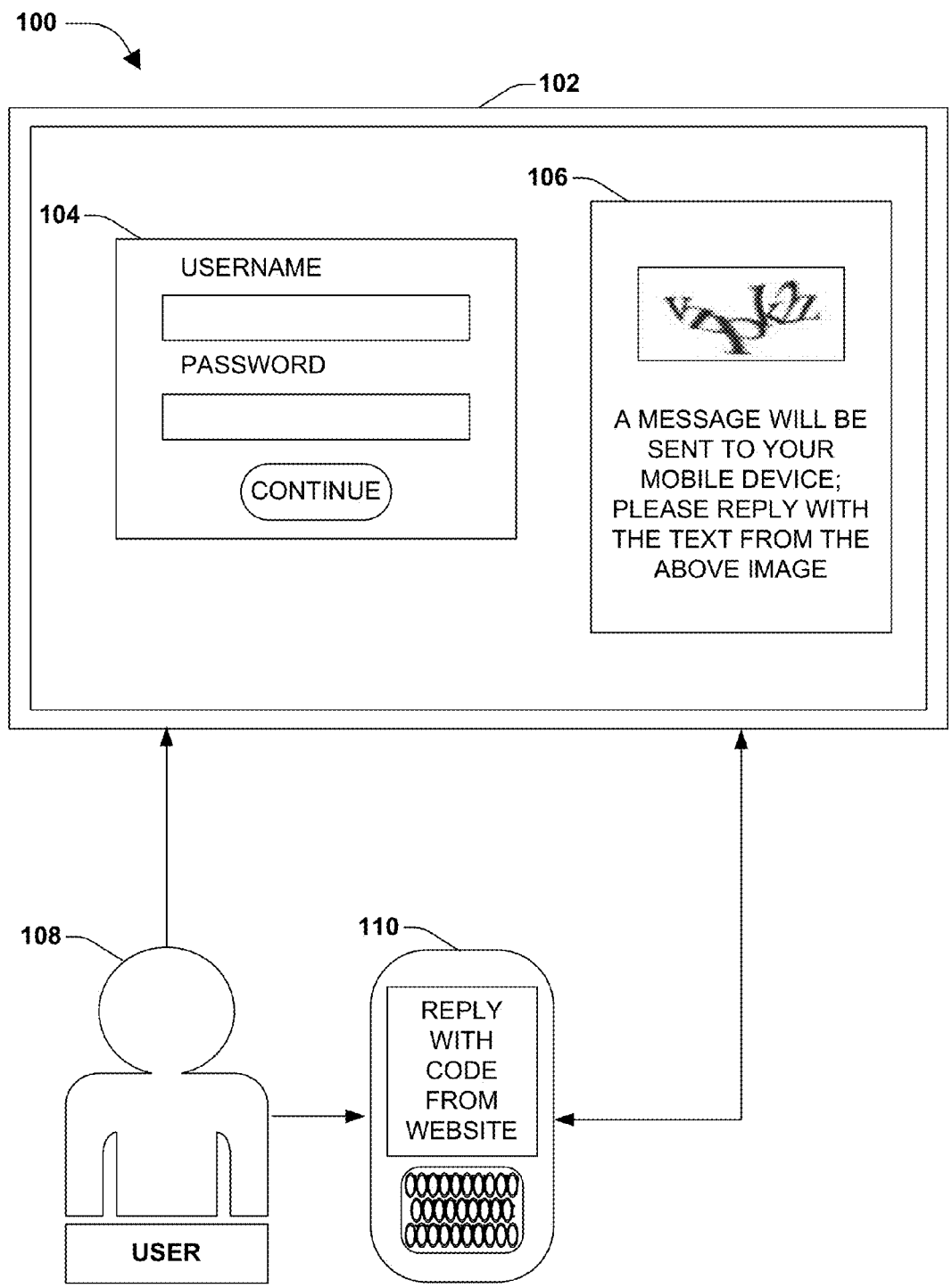
FIG. 1 is a block diagram illustrating an exemplary embodiment of a multi-factor user authentication.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is an illustration of an example multi-factor user authentication 100. In this example, a browser page 102 comprises a first authentication factor 104 in the form of a user log in, using a username and password. When a user 108 initiates authentication by entering their username and password into the login box 104, a second level of authentication can, for example, be present in a second frame 106 on the browser page 102. In this example, the second frame can contain an image of distorted text (e.g., a CAPTCHA image), and a status message telling the user that a message will be sent to their mobile device 110, along with instructions on how to proceed.

In the example authentication 100, in order to proceed with the user authentication, a user 108 receives the message concerning authentication on their mobile device 110. In this example, the message may comprise a SMS-based text message, and can include instructions on how to complete authentication. The user 108 can send a reply to the message, which includes the text code from the distorted text image in the frame 106 on the browser page 102. Having received an appropriate response to the authentication message, the user 108 can be authenticated.

In one embodiment, users may wish to access a website that comprises personal information about the user (e.g., a website for accessing an individual's medical records from a clinic). In this embodiment, the website may ask a user to log in using a pre-registered username and password, which can be used to identify authentication information on the user from a database. However, if a user is attempting to access the authentication service for a first time, for example, certain registration information may be needed in order to process user authentication. As an example, a user may need to register a mobile device that can be used by the authentication service for sending authentication messages.

In one aspect, a user of a third-party website that utilizes a multi-factor authentication service, for example, to perform online transactions, may first need to register with the multi-factor authentication service. In one embodiment, registration can include providing the service with a mobile device access code, such as a mobile phone number, so that a second authentication for the user can utilize the mobile device. Further, in this aspect, the user may wish to manage details of their multi-factor authentication service, for example, such as viewing past transactions involving their authentication. In this example, account management may also involve allowing a user to revoke a mobile device's designation for authentication.

Figure 2:
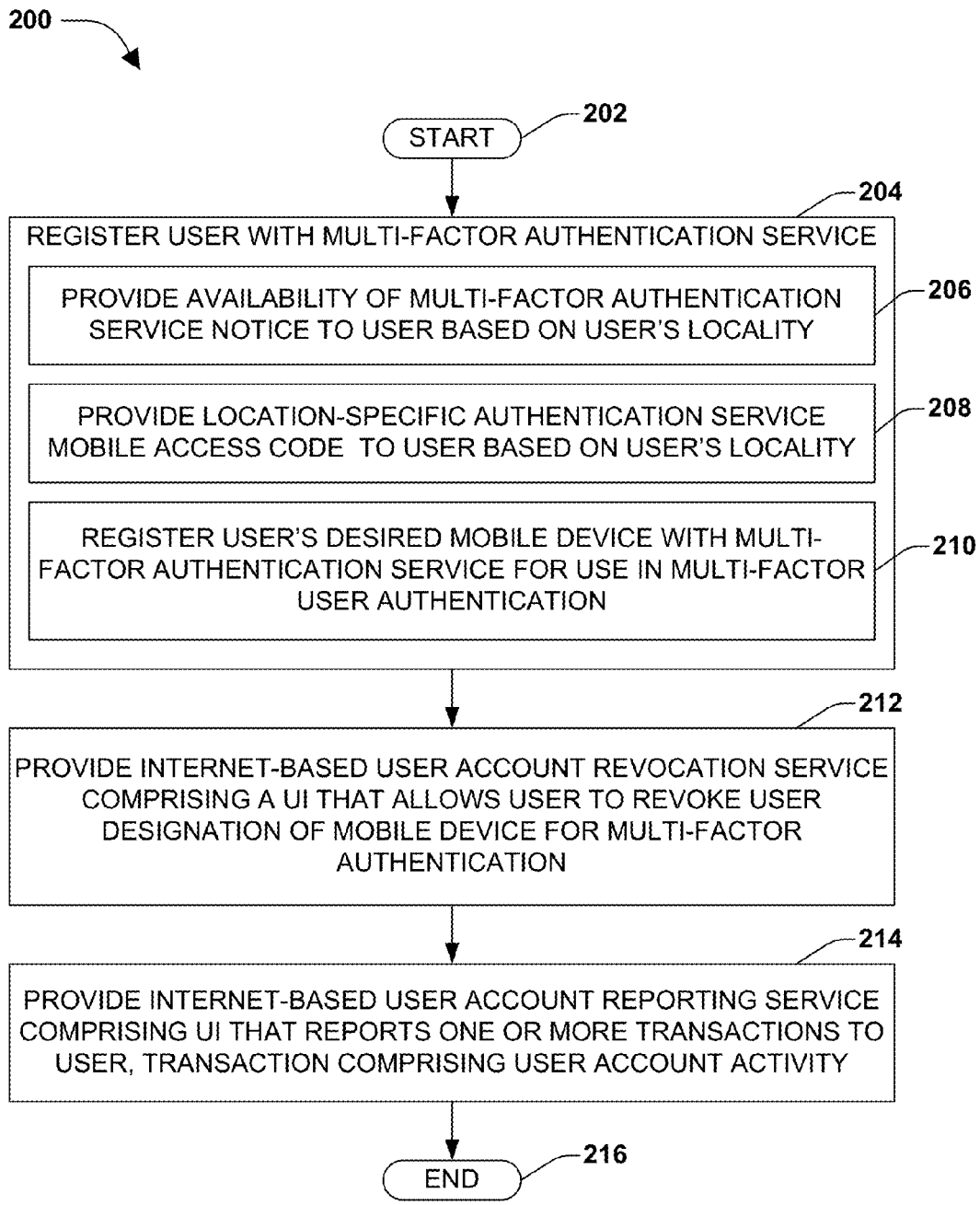
FIG. 2 is a flow chart diagram illustrating an exemplary method for providing authentication service account management to a user of a multi-factor authentication service of third-party websites.

FIG. 2 is a flow chart of an exemplary method 200 for providing authentication service account management to a user of a multi-factor authentication service of third-party websites. The exemplary method 200 begins at 202 and involves registering a user with the multi-factor authentication service, at 204. Registering the user can comprise providing the user with a notice of availability of the multi-factor authentication service, based on their locality, at 206. As an example, a multi-factor authentication service may utilize a short-message service (SMS) based second level of authentication, that may be particular to a country in which the user is located. In this example, if a user may be utilizing this service in a country that the multi-factor authentication service does not have a capability to operate, a notice can be provided to the user (e.g., on a website where a user may be registering) that tells that the service is not available.

At 208, registering the user can further comprise providing a location-specific authentication service mobile access code to the user, based on their locality. In one embodiment, for example, a mobile device designated by a user of the service may comprise a mobile phone. In this embodiment, a short-code can be used by the user to access the multi-factor authentication service using their mobile phone, for example, to reply to an authentication message or to query the service for account information. Further, in this embodiment, short-codes used by mobile phones can be specific to a geographic locality, such as a country, for example. In this embodiment, a country-specific short-code can be provided to the user for accessing (e.g., calling) the multi-factor authentication service.

At 210, in the exemplary method 200, registering the user can further comprise registering the user's desired mobile device (e.g., mobile phone) with the multi-factor authentication service, to be used for during multi-factor authentication. As an example, once a mobile phone is registered, a multi-factor authentication service can send a SMS message (e.g., a text message) to a user's designated phone after the user logs onto a third-party website that utilizes the service. In this example, in order to be authenticated (e.g., by a second level) the user can reply to the SMS message with a code displayed on the website (e.g., or in another embodiment, the user can enter a code into the website that was sent to their phone by SMS).

In the exemplary method 200, at 212, an Internet-based user account revocation service can be provided, which can comprise a user interface (UI) that allows a user to revoke a designation of a mobile device for future multi-factor authentications by the multi-factor authentication service. For example, if a user of the multi-factor authentication service were to lose the mobile device that they designated for the authentication service, they may not be able to access areas of website that utilize the service. Further, in this example, if another person found the mobile device, they may be able to authorize transactions to which the user was not a party. Therefore, in one embodiment, a user can log onto their account with the authentication service and deactivate the lost phone for use in the authentication, for example.

In another embodiment, the Internet-based user account revocation service UI can provide a user with an ability to allow authentication without using the user's designated mobile device. As an example, if a user were to lose their mobile device and deactivate the device using the authentication service's user account UI, a user may still wish to access third-party websites that utilize the multi-factor authentication service. In this example, the authentication service can allow a user to authenticate without having to utilize the lost mobile device. Further, the authentication service may limit this type of override, for example, to one-time before requesting that a user reactivate a security protocol. In another example, a user may be located in an area in which they can not receive messages to their designated mobile device (e.g., out of cell tower range), or the mobile device may not be operable (e.g., defective/drained battery, lost battery, damaged device, etc.). In this example, the authentication service may allow a user a "one-time override" for using the mobile device, by performing additional security measures (e.g., shared secret PINs, shared secret questions, etc.) from the user's account on the authentication website.

In the exemplary method 200, at 214, an Internet-based user account reporting service can be provided, which can comprise a UI that reports user account activity transaction to the user. For example, a user may wish to review online transactions that have utilized the multi-factor authentication service, such as secure logins, online purchases, or downloads. In this way, in this example, a user may have an ability to monitor activity associated to their account for fraud prevention or general accounting purposes. Having provided an account reporting service, the example method 200 ends at 216.

Figure 3:
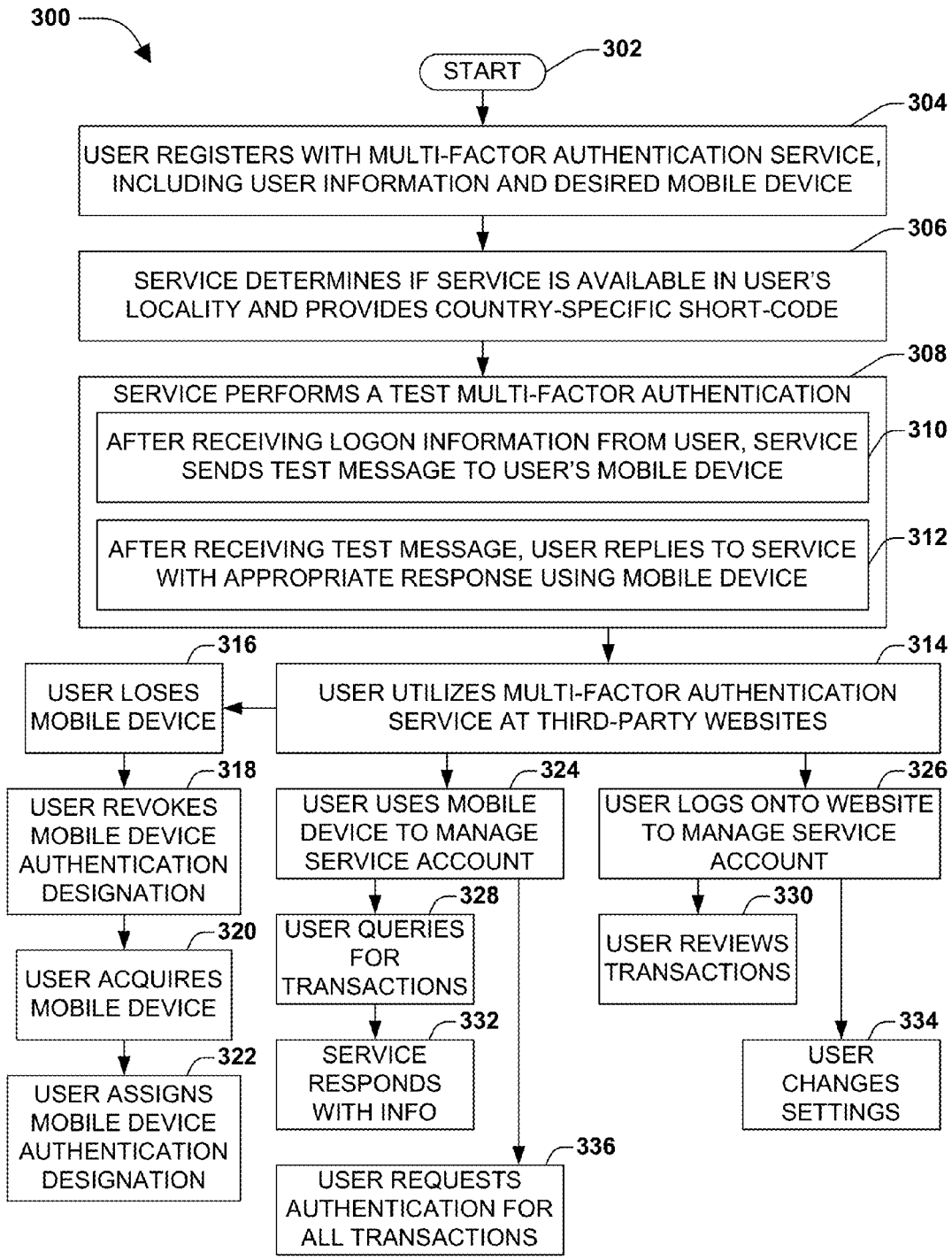
FIG. 3 is a flow chart illustrating one exemplary embodiment of a user utilizing a provision of authentication service account management.
Figure 4:
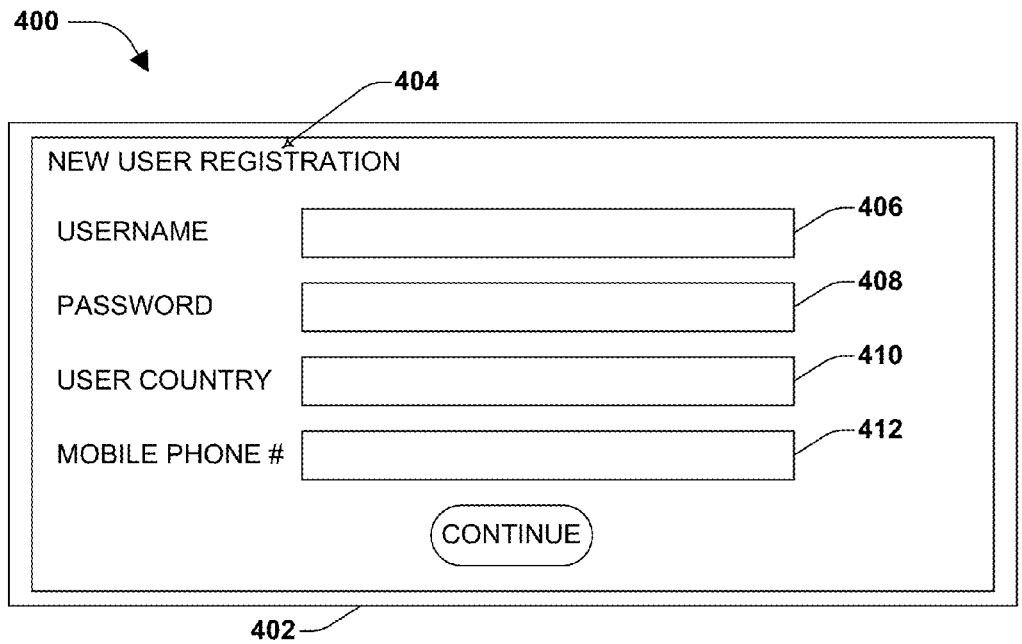
FIG. 4 is an illustration of an exemplary embodiment of a user registration window from a multi-factor authentication website.

FIG. 3 is a flow chart illustrating one exemplary embodiment 300 of a user utilizing a provision of authentication service account management. In the exemplary embodiment 300 a user can register with a multi-factor authentication service, at 304, which can include supplying user-related information along with a mobile device access number (e.g., mobile phone number) the user designates for multi-factor authentication. As an example, FIG. 4 is an illustration of an exemplary embodiment 400 of a user registration window 402 from a multi-factor authentication website 404. In this exemplary embodiment 400, a user registering to utilize the multi-factor authentication service can enter a username 406, a password 408 (e.g., a shared secret comprising an alphanumeric string), a country in which the user will be utilizing the service 410, and a number for their designated mobile phone 412 (e.g., which the service can use for a second level of authentication).

In another embodiment, a user may be asked to enter additional private information, such as a real name, a physical address, other contact information, and billing information (e.g., if a cost is associated with the authentication service). Further, in this embodiment, the user may supply an answer to a specific question that merely the user will know, in case the password is forgotten by the user. Additionally, in another embodiment, where a user may share their designated mobile device with at least one other person, for example, the user may wish to set up a separate personal identification code (PIC), which may be merely known by the user. In this way, in this example, merely the user can authenticate using the mobile device using the PIC, as a second person using the phone may not know the PIC.

In FIG. 3, at 306 in the exemplary embodiment 300, the multi-factor authentication service can determine whether authentication services can be offered in the user's locality (e.g., country), and if they are, provide a country-specific short code for the user to access the service remotely, for example. In one embodiment, the user can enter a location (e.g., a country) where the user wishes to utilize the authentication services. In this embodiment, for example, the service can determine whether their services can be offered in the country in which the user plans to use the service. In this example, the multi-factor authentication service may not have facilities or operational capabilities in a particular country, thereby limiting availability of the service in that particular country.

In another embodiment, a location of the registered user can be determined using a reverse Internet protocol (IP) lookup. In this embodiment, for example, the service may retrieve an IP address for the computer used by the user during the registration and perform a reverse IP lookup to determine a geographic location of the user (e.g., in which country the user is located).

In one embodiment, a short-code can be used by a mobile device, such as a mobile phone, to contact the multi-factor authentication service. The short-code can be used, for example, to reply to an authentication message from the service or to access user account information from the service. In this embodiment, a short-code may be particular to respective geographic locations. For example, a user located in the United States may use a first short-code, while a user in France may use a second short-code to access the authentication service from a mobile device. In this example, the multi-factor authentication service can provide a short-code to the user that can be used in the country in which the user intends to utilize the service.

At 308 in the exemplary embodiment 300, the multi-factor authentication service can perform a test multi-factor authentication. For example, in order to determine whether the designated mobile device can be used for authentication, and/or to give the user some experience in utilizing the multi-factor authentication, the service can perform a test authentication while walking the user through the steps. One embodiment of a multi-factor authentication is illustrated in FIG. 1, 100, as described above.

At 310, in this embodiment, the service can send a test second-level authentication message to the user's mobile phone, for example, after the user has input their appropriate first-level authentication logon information. For example, as shown in FIG. 1, 100, the user 108 can enter their username and password in 104 at the service's webpage 102, and the service can send a SMS message to the user's mobile phone 110, which instructs the user 108 on how to complete the authentication.

At 312, in the exemplary embodiment 300, while performing the test multi-factor authentication can comprise having, the user can reply to the test message sent by the service using their mobile phone, with an appropriate response. As an example, in FIG. 1, 100, the user 108 is asked to reply to the SMS message sent by the service with a code that is shown 106 on the service's webpage. In this example, the user 108 can enter the displayed code 106 into a reply SMS message sent to the service using a short-code for accessing the service from a mobile device.

In another embodiment, for example, an SMS message sent to a user's mobile phone may contain a code. In this example, the user may be asked to enter the code from the SMS message into a box on the service's website. In this way, in this example, merely the user that receives the message on their mobile phone, and who is utilizing the service from a computer, can enter the code for a second-level authentication.

Figure 5:
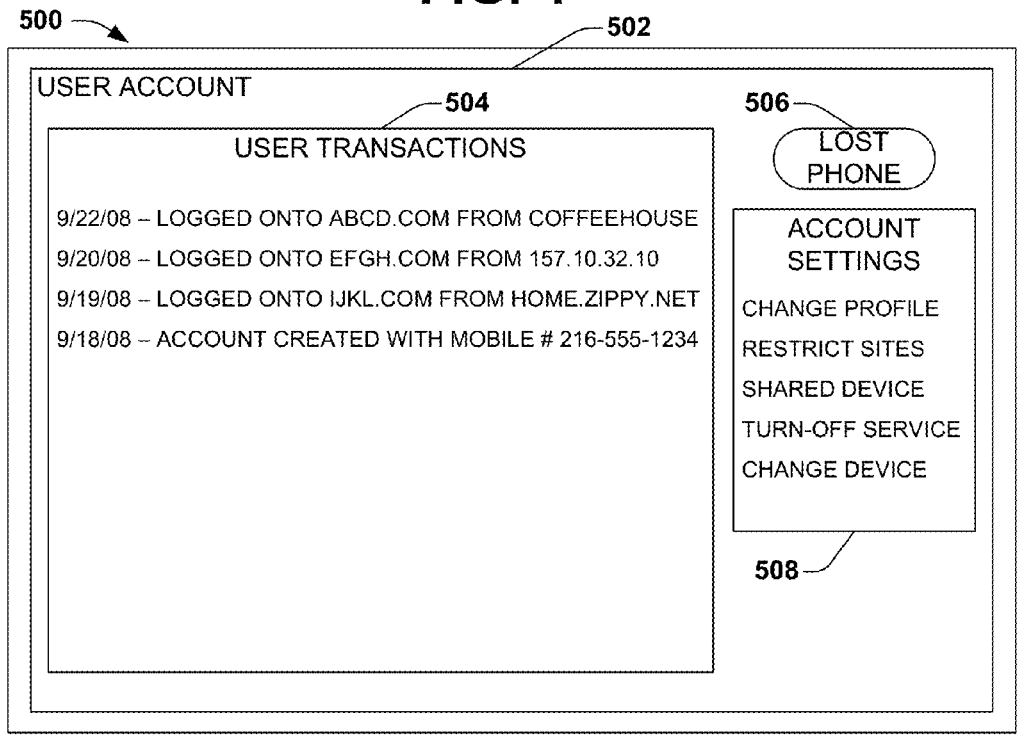
FIG. 5 is an illustration of an exemplary embodiment of a user account management window from a multi-factor authentication website.

In FIG. 3, at 314 in the exemplary embodiment 300, after the user is registered with the multi-factor authentication service, the user may begin to access one or more third-party websites that utilizes the multi-factor authentication service. In one embodiment, a user may wish to manage aspects of their multi-factor authentication account. At 316, a user may lose their mobile device that was designated by the user for use in a multi-factor authentication. At 318, for example, a user can log onto their multi-factor authentication account and revoke the mobile device's designation for authentication. As an example, FIG. 5 is an illustration of an exemplary embodiment 500 of a user account management window 502 from a multi-factor authentication website. In this embodiment 500, as an example, the user may activate a button 506 on the webpage that can automatically remove the user's mobile phone designation from their authentication account. In another embodiment, activating a "lost phone" event in the account may enable a user to activate a different mobile device for authentication.

At 320, in the exemplary embodiment 300 of FIG. 3, a user may reacquire the lost mobile device, or they may acquire a new mobile device. At 322, a user can utilize the account management service for the multi-factor authentication service to reactivate the found mobile device, or to activate a new mobile device for use in multi-factor authentication.

After utilizing the multi-factor authentication service, for example, via third-party websites, a user may wish to review transactions for which their account has been used. At 326 in the exemplary embodiment 300, a user can log onto a multi-factor authentication service website (e.g., as in FIG. 5, 500) to manage their account. At 330, the user may review a transaction report, for example, which can include a list of transactions attributed to the user's account. In FIG. 5, 500, a user transactions report 504 can comprise a list of account activity, for example, including transaction date, action, domain utilizing authentication, and location from which the authentication was initiated (e.g., by the user). In one embodiment, the transactions can be sorted by the various elements in respective transactions (e.g., date, location, etc.). Managing account transactions, for example, may facilitate fraud prevention for the user, whereby fraudulent transactions can be identified.

At 334, a user can access the account management services to change settings for the account. As an example, in FIG. 5, 500, an account settings box 508 can be located on the authentication service webpage 502 for the user's account. In this example, a user may select from a list of account settings that can be changed. As an example, a user may wish to merely have a third-party website utilize the multi-factor authentication service upon initially logging on to the site, and not require the multi-factor authentication for a certain period of time after the initial logon. In this example, a user can manage their account settings to determine a length of time between multi-factor authentications. Other account setting that can be managed, for example, may include changing a user's profile (e.g., including billing information if needed), restricting authentication for specific third-party sites, activating a shared mobile device code (as described above), turning-off or restricting the service, and changing a mobile device designation.

At 324, in the exemplary embodiment 300, a user may use their mobile device to manage their service account, for example, without logging onto a website. In this embodiment, at 328, a user can send a query to the multi-factor authorization service using, for example, a short-code, requesting information concerning a last transaction that was completed and/or attempted for the user's account. In this embodiment, at 332, the service can reply with the requested information. In this way, for example, a user may manage their account using merely their mobile device (e.g., by sending requests for information or to change settings).

At 336, a user may request that future transactions involving the user, at third-party sites that utilize the multi-factor authentication service, apply the multi-factor authentication. In this embodiment, the request can be sent by the user to the service using their mobile device and the access code (e.g., short-code) for the service. As an example, a user may have set up their account to merely utilize the multi-factor authentication for third-party sites once per week when logging onto the sites. In this example, a user can request that all future logons to the third-party sites utilize the multi-factor authentication.

It will be appreciated that, while some examples of user account management service have been described in the embodiment and example above, the techniques described herein are not limited to these embodiment and examples. Those skilled in the art may devise techniques and systems for alternate user account management services that can be utilized by the techniques and systems described herein.

In another aspect, in order for third-party websites to have their users utilize multi-factor authentication services, they can register with the multi-factor authentication service. In this aspect, setting up a multi-factor authentication service on a third-party website can be cumbersome. For example, prior business relationships, hardware and software installation and setup, and other human intervention are typically needed to have this type of multi-factor authentication for a website. However, a method can be devised for registering a third-party website to utilize a multi-factor authentication service, while mitigating human intervention between the third-party website and the multi-factor authentication service.

Figure 6:
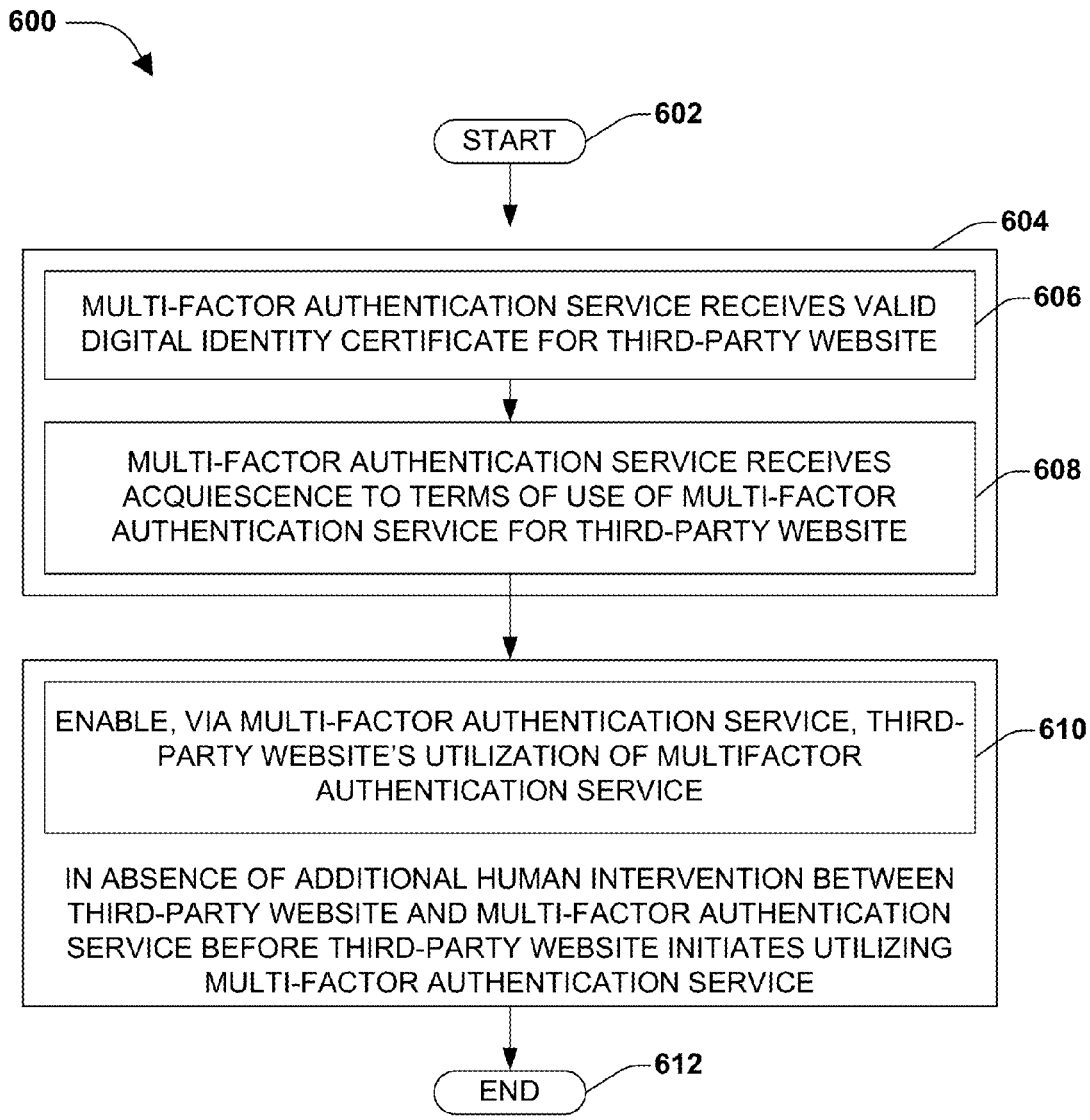
FIG. 6 is a flow chart diagram illustrating an exemplary method for registering a third-party website to utilize a multi-factor authentication service.

FIG. 6 is a flow chart diagram illustrating an exemplary method 600 for registering a third-party website to utilize a multi-factor authentication service. The exemplary embodiment 600 begins at 602 and comprises registering the third-party website 604. At 606, registration of the third-party website can comprise the multi-factor authentication service receiving a valid digital identity certificate for the third-party website. For example, in order to initiate a third-party website registration with the authentication service, a valid public key certificate that certifies an identity or the third-party website can be sent to the multi-factor authentication service. In this way, in this example, the service can know a valid identity of the third-party website (e.g., and those responsible for it) for future potential transactions between them (e.g., billing, shutdown of services, etc.).

At 608, registration of the third-party website can comprise the multi-factor authentication service receiving an acquiescence to terms of use of the multi-factor authentication service for the third-party website. For example, in one embodiment, after receiving a valid public key certificate that certifies an identity or the third-party website, the multi-factor authentication service may send the terms of use of the multi-factor authentication service to those responsible for the third-party website. In this embodiment, those responsible for the third-party website can return an executed copy of the terms of use, or another indication that they acquiesce to the terms. In another embodiment, the terms of use may comprise language that indicates to those responsible for the third-party website that initiation of the multi-factor authentication service by the third-party website indicates acquiescence to the terms of use.

At 610, in an absence of additional human intervention between the third-party website and the multi-factor authentication service before the third-party website initiates utilizing the multi-factor authentication service, the multi-factor authentication service can enable the third-party website to utilize the multi-factor authentication service on the registered website. As an example, after registration of the third-party website to the multi-factor authentication service, the service can activate the service for the third-party website. In one embodiment, activation of the service may comprise sending an access code to the third-party website that can be used to access the service. In another embodiment, the service may be activated by supplying code to the third-party website, that a developer can install in the site to utilize the service. In another embodiment, the service may be activated by having the multi-factor authentication service provider install the third-party website's domain in a list of registered users.

It will be appreciated that service activation may comprise alternate techniques devised by those skilled in the art. Further, the techniques and systems, described herein, are not limited to embodiments for activation of the service as described above.

Figure 7:
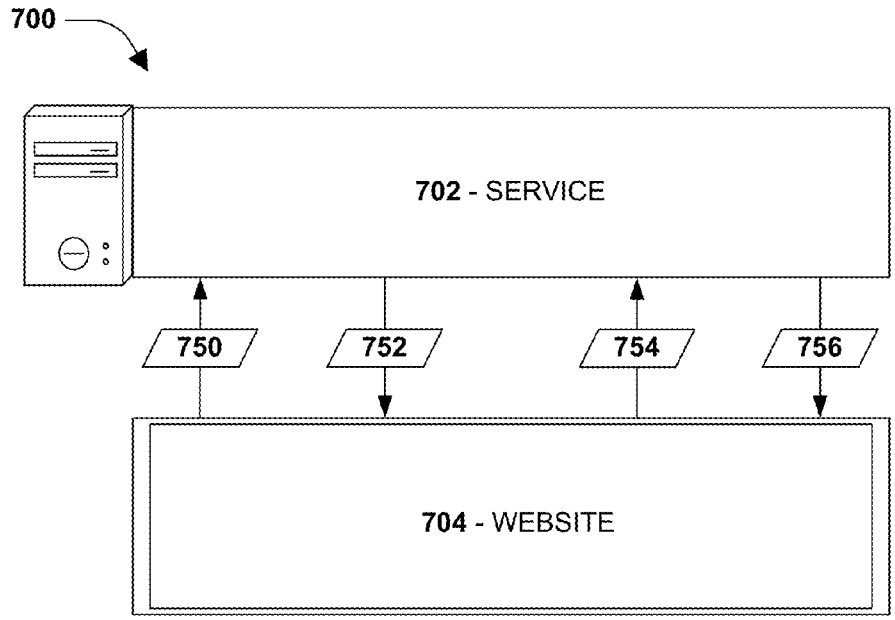
FIG. 7 is a block diagram illustrating one exemplary embodiment of a third-party website registering with a multi-factor authentication service.

FIG. 7 is a block diagram illustrating one exemplary embodiment 700 of a third-party website registering with a multi-factor authentication service. In this embodiment, 700, the third-party website 704 sends a valid digital identification certificate 750 to the multi-factor authentication service 702. For example, a third-party website developer may send an email to the service requesting registration, along with an attached public key certificate.

In this embodiment 700, after receiving the certificate, the multi-factor authentication service 702 can send terms of use for the service 752 to the third-party website 704. The third-party website 704 can then send an indication that they accept 754 the terms of use for the service, and the service 702 can send an activation code 756 to the third-party website 704, so that they can begin utilizing the service.

In another embodiment, a third-party website developer may respond to an ad, for example, which incorporates terms of use for the multi-factor authentication service. In this example, acquiescence to the terms of use may comprise a sending of the digital identification certificate to the multi-factor authentication service provider.

In another embodiment, registering and activating a multi-factor authentication service can be associated with website development services available from a website development portal. For example, a third-party website developer may utilize a website development portal to facilitate development and management of their website. In this example, the multi-factor authentication service can be one of a plurality of a la carte services available from the development portal. As such, in this example, the third-party website developer may register with the development portal (e.g., including supplying a valid digital identification certificate), and later select the multi-factor authentication service for their website.

Figure 8:
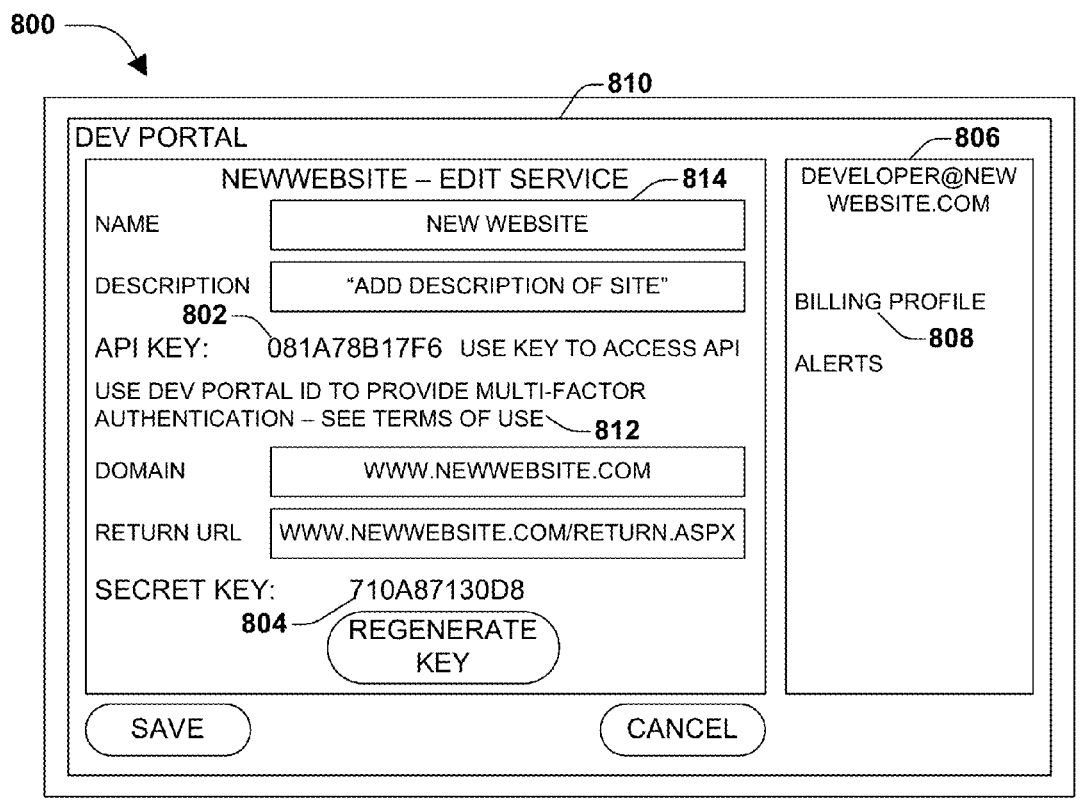
FIG. 8 is an illustration of another exemplary embodiment of a third-party website registering with a multi-factor authentication service.

FIG. 8 is an illustration of another exemplary embodiment 800 of a third-party website registering with a multi-factor authentication service, for example, utilizing a website development portal relationship. In this exemplary embodiment 800, a third-party website developer (e.g., developer@newwebsite.com) can pre-register with a development portal 810. As an example, registering with the development portal 810 can comprise sending a public key certificate to identify the third party website, along with acquiescence to terms of use 812. Additionally, in this embodiment 800, registration can include the developer's profile information 806, the third-party website information 814, and can include billing information 808 (e.g., if the development portal charges for service, a credit card may be kept on file).

In this embodiment, when a registered developer wishes to add the multi-factor authentication service to their website, the developer can select the service from a list of service offered by the development portal 810. Upon registering for the service, for example, an application programming interface (API) code 802 can be generated, which enables the third-party website to access an API for utilizing the authentication service on their website. Additionally, a secret key 804 (e.g., a shared secret between the third-party website and the development portal) can be generated, which can be used to authenticate the third-party website when accessing services.

It will be appreciated that those skilled in the art may devise alternate embodiments of registering and enabling a third-party website to utilize an authentication service, while merely having the service receive a valid digital identification certificate, acquiescence to terms of use, and enabling the third-party to use the service. However, the techniques described herein are not limited to the embodiment described above, merely that the steps described are performed in the absence of additional human intervention between the third-party website and the multi-factor authentication service before the third-party website initiates utilizing the multi-factor authentication service.

Figure 9:
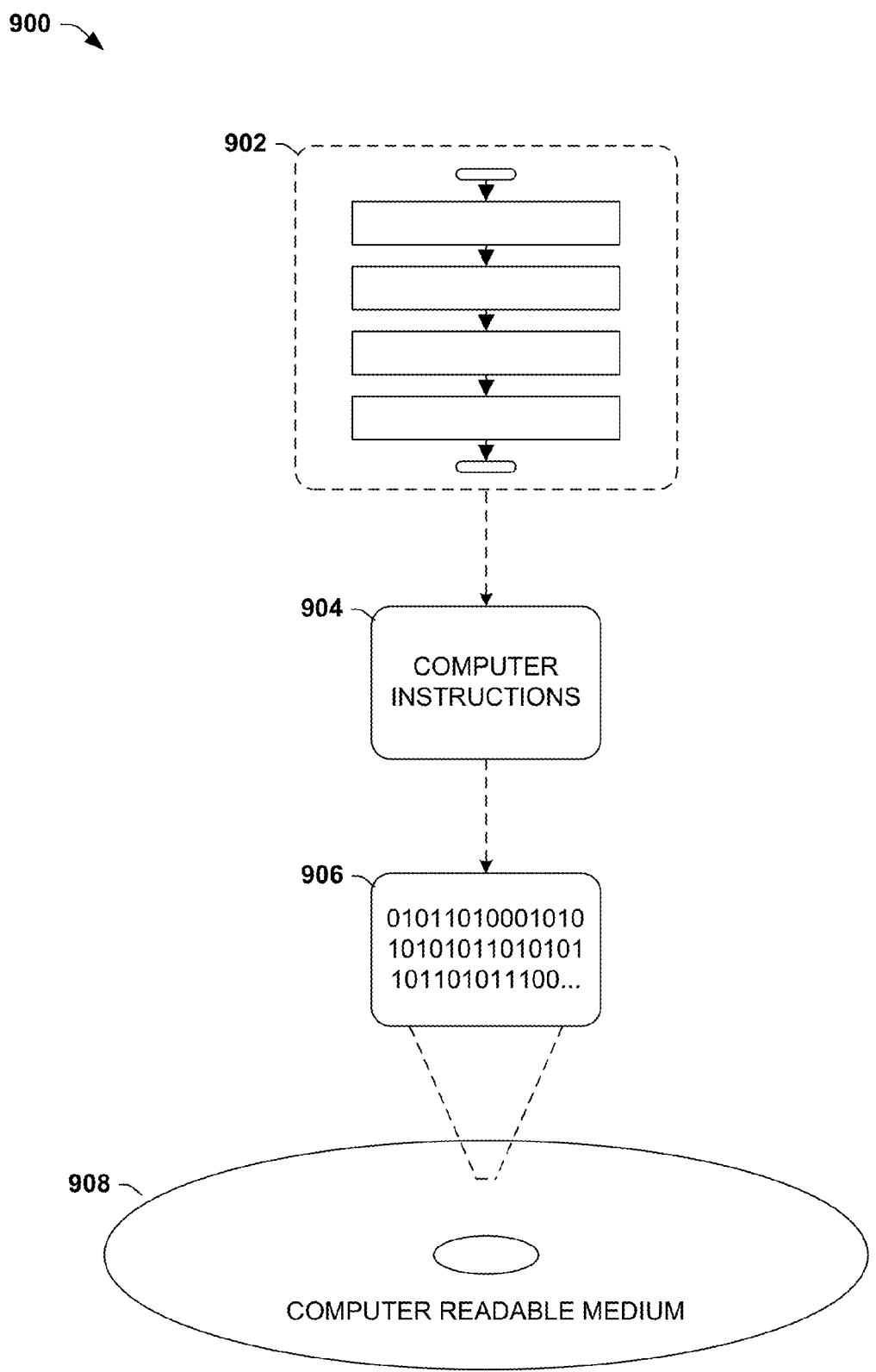
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the processor-executable instructions 904 may be configured to perform a method 902, such as the exemplary method 200 of FIG. 2, for example. In another such embodiment, the processor-executable instructions 904 may be configured to perform a method, such as the exemplary method 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
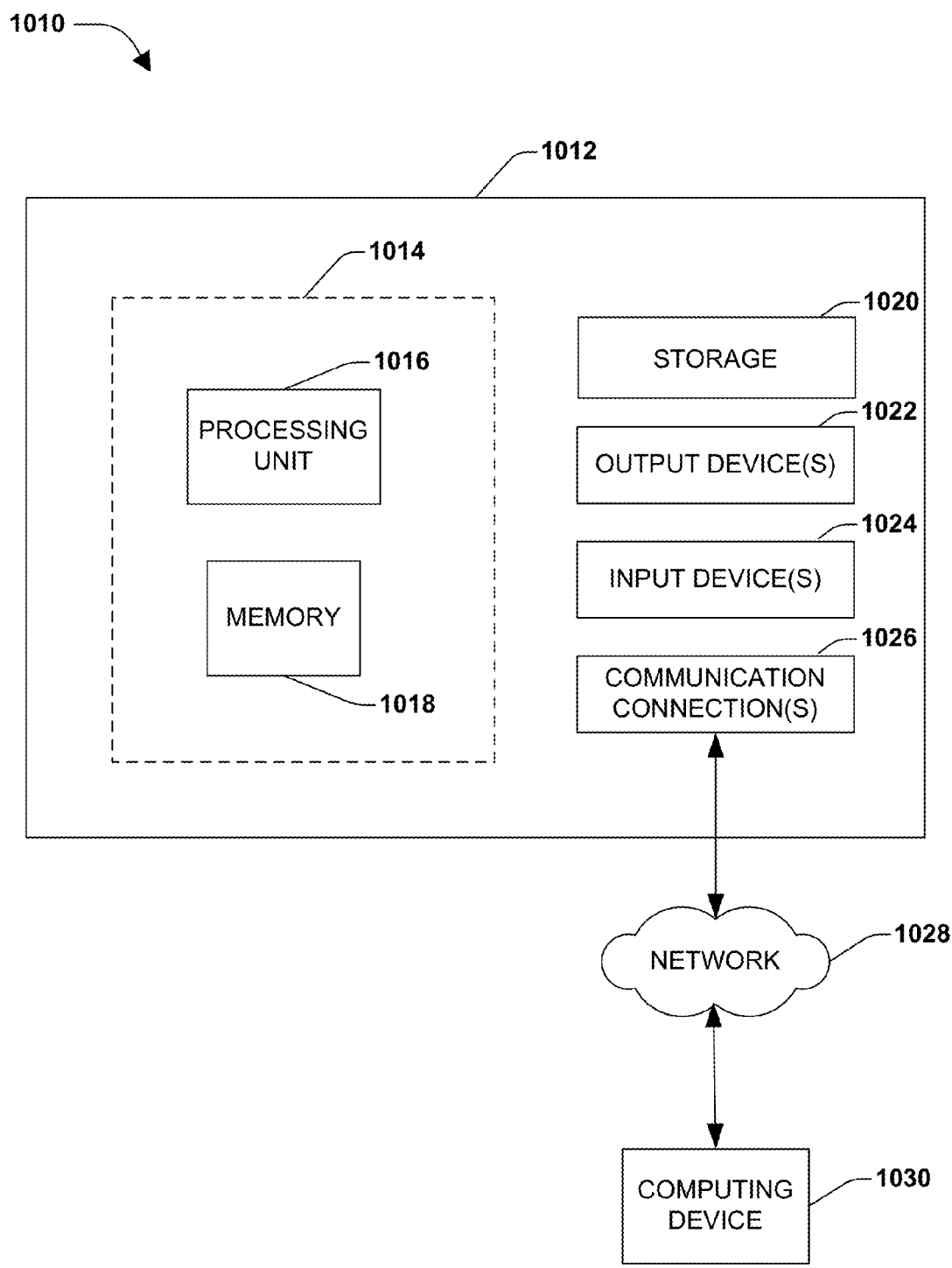
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    enabling a third-party website to utilize a multi-factor authentication service;
    registering a user of the third-party website with the multi-factor authentication service, the registering comprising at least one of:
        providing an indication of an availability of the multi-factor authentication service to the user;
        providing a short-code to the user; or
        registering a mobile device of the user;
    providing a user account revocation service comprising a user interface (UI) that enables the user to revoke user designation of the mobile device for multi-factor authentication; and
    providing a user account reporting service comprising a UI that enables the user to access a report, the report indicative of at least one of a domain of a second third-party website initiating the multi-factor authentication service in association with the user or an internet protocol (IP) address of a second user engaging the multi-factor authentication service in association with the user.

2. The method of claim 1, the enabling performed based upon at least one of a digital identity certificate or an acquiescence to terms of use of the multi-factor authentication service.

3. The method of claim 1, the providing an indication performed based upon a locality of the user.

4. The method of claim 1, the providing a short-code performed based upon a locality of the user.

5. The method of claim 1, the report corresponding to one or more transactions.

6. The method of claim 1, the report indicative of both the domain and the IP address.

7. The method of claim 1, the report indicative of at least one of a transaction date or a transaction time.

8. A system, comprising:
    one or more processing units; and
    memory comprising instructions that when executed by at least some of the one or more processing units, perform a method comprising:
        enabling a third-party website to utilize a multi-factor authentication service;
        registering a user of the third-party website with the multi-factor authentication service, the registering comprising at least one of:
            providing an indication of an availability of the multi-factor authentication service to the user;
            providing a short-code to the user; or
            registering a mobile device of the user;
        providing a user account revocation service comprising a user interface (UI) that enables the user to revoke user designation of the mobile device for multi-factor authentication; and
        providing a user account reporting service comprising a UI that enables the user to access a report, the report indicative of a domain of a second third-party website initiating the multi-factor authentication service in association with the user.

9. The system of claim 8, the enabling performed based upon at least one of a digital identity certificate or an acquiescence to terms of use of the multi-factor authentication service.

10. The system of claim 8, the providing an indication performed based upon a locality of the user.

11. The system of claim 8, the providing a short-code performed based upon a locality of the user.

12. The system of claim 8, the report corresponding to one or more transactions.

13. The system of claim 8, the report indicative of an internet protocol (IP) address of a second user engaging the multi-factor authentication service in association with the user.

14. The system of claim 8, the report indicative of at least one of a transaction date or a transaction time.

15. A computer readable storage medium, excluding signals, comprising instructions that when executed, perform a method, comprising:
    enabling a third-party website to utilize a multi-factor authentication service;
    registering a user of the third-party website with the multi-factor authentication service, the registering comprising at least one of:
        providing an indication of an availability of the multi-factor authentication service to the user;

providing a short-code to the user; or registering a mobile device of the user;

providing a user account revocation service comprising a user interface (UI) that enables the user to revoke user designation of the mobile device for multi-factor authentication; and providing a user account reporting service comprising a UI that enables the user to access a report, the report indicative of an internet protocol (IP) address of a second user engaging the multi-factor authentication service in association with the user.

16. The computer readable storage medium of claim 15, the method comprising displaying a code for the user via the third-party website.

17. The computer readable storage medium of claim 15, the method comprising sending a code to the user via a message to the mobile device of the user.

18. The computer readable storage medium of claim 15, the method comprising receiving a code from the user via the third-party website.

19. The computer readable storage medium of claim 15, the method comprising receiving a code from the user via a message from the mobile device of the user.

20. The computer readable storage medium of claim 15, the report indicative of a domain of a second third-party website initiating the multi-factor authentication service in association with the user.

* * * * *